April 21, 1959   J. C. GODFREY   2,882,617
SET OF ATOMIC MODELS FOR THE TEACHING OF CHEMISTRY
Filed Aug. 21, 1957   3 Sheets-Sheet 1
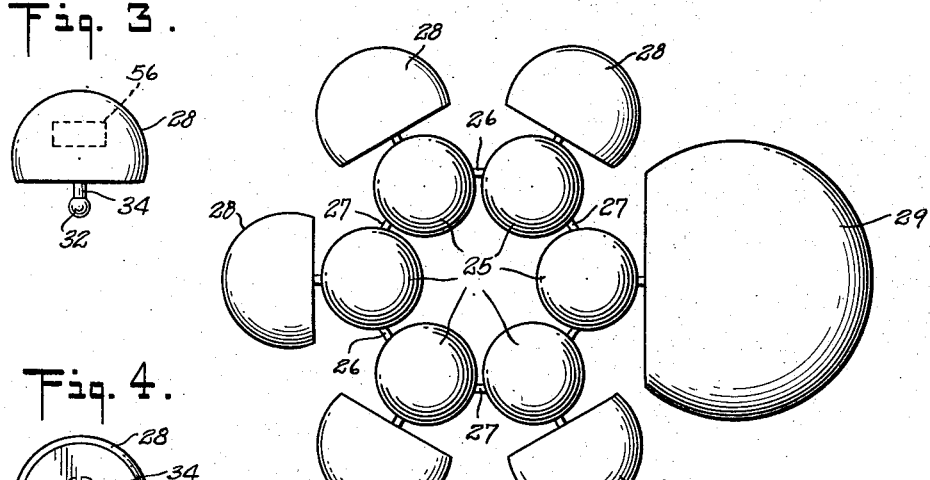
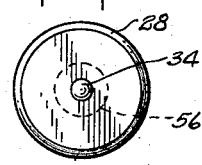
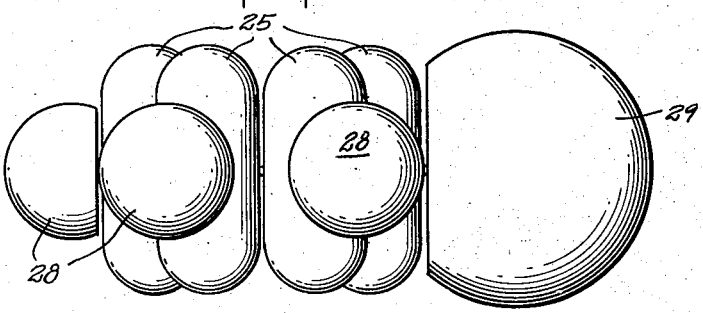
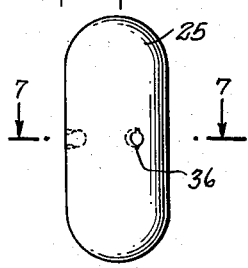
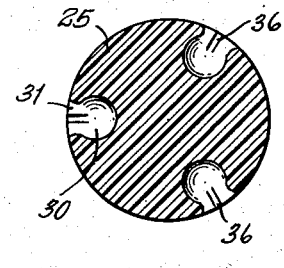
INVENTOR.
JOHN C. GODFREY
BY
Paul M. Phillips
ATTORNEY April 21, 1959     J. C. GODFREY     2,882,617
SET OF ATOMIC MODELS FOR THE TEACHING OF CHEMISTRY
Filed Aug. 21, 1957     3 Sheets-Sheet 2
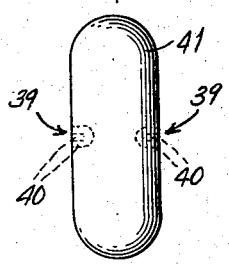
Fig. 8.
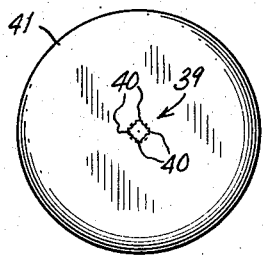
Fig. 9.
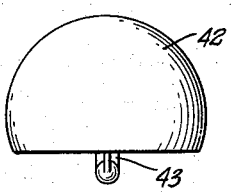
Fig. 10.
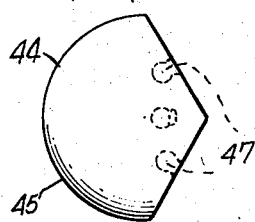
Fig. 12.
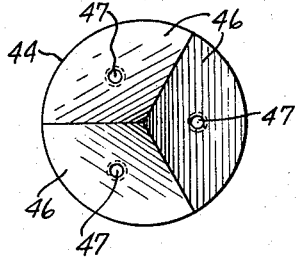
Fig. 13.
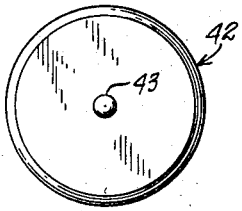
Fig. 11.
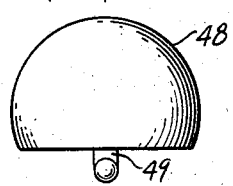
Fig. 14.
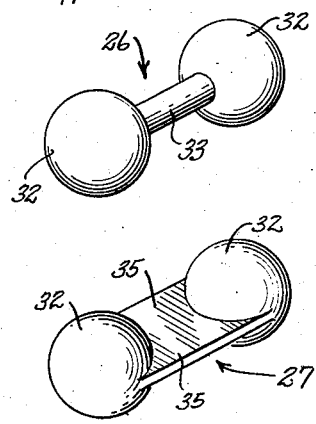
Fig. 16.
Fig. 17.
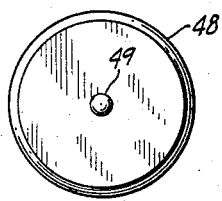
Fig. 15.
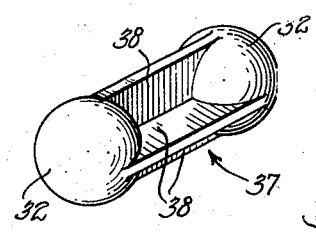
Fig. 18.
INVENTOR.
JOHN C. GODFREY
BY
Paul M. Phillips
ATTORNEY April 21, 1959        J. C. GODFREY        2,882,617
SET OF ATOMIC MODELS FOR THE TEACHING OF CHEMISTRY
Filed Aug. 21, 1957        3 Sheets-Sheet 3
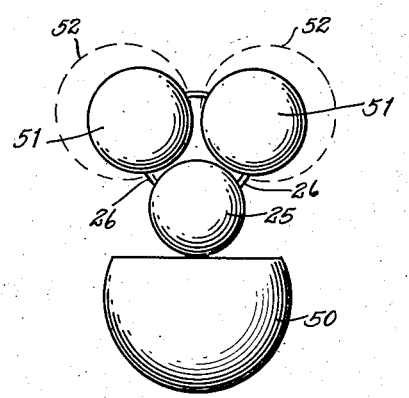
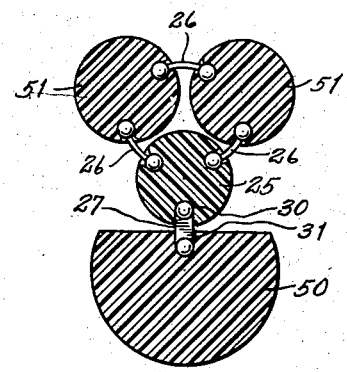
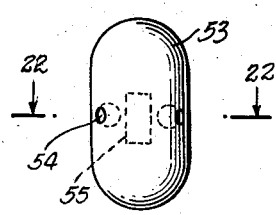
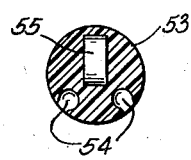
INVENTOR.
JOHN C. GODFREY
BY
Paul M. Phillips
ATTORNEY United States Patent Office 2,882,617
Patented Apr. 21, 1959

2,882,617

SET OF ATOMIC MODELS FOR THE TEACHING OF CHEMISTRY

John C. Godfrey, New Brunswick, N.J., assignor to Godfrey Molecular Models, Inc., New Brunswick, N.J., a corporation of New Jersey Application August 21, 1957, Serial No. 679,376

8 Claims. (Cl. 35—18)

The present invention relates to a set of atomic models such as may be used in the teaching of chemistry and particularly to a set of such models which lends itself to illustrating the arrangement of atoms in molecules and particularly which lends itself to the making of models representative of complex molecules such as are encountered in organic chemistry.

Various attempts have been made in the prior art to provide sets of atomic models for the general purposes for which the present invention is intended. Some of such models comprise individual atom models representing various types of atoms and wherein special arrangements, such as snap action devices similar to the conventional metallic snap fasteners, are provided in the models and/or in connectors for use therewith. These models, while eminently satisfactory from certain points of view, are very expensive from the point of view of the prospective purchaser, so as to be practically prohibitive in many instances where it might be desired to use a model set of this type.

Again, difficulty has been experienced with model sets of the prior art due to the fact that while the models will lend themselves to the making, for example, of a six-member carbon ring, such as the conventional benzene ring, they do not lend themselves to rings having fewer than six members, for example, pyrrole rings (five members), cyclobutane (four members), or in an extreme case, a three-member ring, such as the carbon-to-carbon nucleus of a compound such as cyclopropanone having the formula:

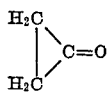

Thus these prior art model sets, while satisfactory for some purposes, leave much to be desired from a practical point of view.

It has also been proposed to make model sets wherein the individual atom models have straight cylindrical holes therein and the connectors comprise flexible cylindrical members, such as spiral springs. Such a combination lends itself to the making of rings of various numbers of members due to the flexibility of the connectors. However, these sets have been to some extent unsatisfactory in that only friction is depended upon to hold the connectors into the cylindrical holes into which they are adapted to fit. While this may be satisfactory at first, continued use of such sets results soon in the holes being enlarged to such an extent that the atom models will not hold together in molecular arrangements. This difficulty is particularly troublesome when simulating relatively large molecules such, for example, as steroid molecules and the like, or some molecules representing organic dyes or polymer molecules.

The present invention provides a set of atomic models which overcomes all these difficulties and at the same time provides a model set which can be easily and quite cheaply manufactured, so as to be saleable at a relatively small price, well within the financial capacity of small institutions or even individuals.

Summarizing the present invention, it comprises a set of atomic models representing different atoms including, for example, carbon, hydrogen, oxygen and nitrogen, wherein each of the atomic models is constructed of a size proportionate to the well-known Van der Waals' and covalent radii for these atoms respectively. Means are provided for connecting the atom models together in a way such as to permit of different relative angular positions between the atom models, so, for example, as to permit of the making of ring structures having different numbers of atoms therein. This is accommodated in part by the flexibility of the connectors used according to this invention. At the same time, provision is made for a resiliently removable, and spring action-type, connection between each connector and the atom model or models with which it may be connected from time to time. This involves an enlarged portion on the outer end of each connector, or each end thereof, which enlarged portion is adapted to be received in a recess formed in an atom model with which it is to be used, the inside portion of the recess having a larger size than the entrance portion thereof, so that the connector will not be inadvertently disconnected from an atom model with which it is intentionally connected. The connectors are preferably of resilient organic plastic material, such as polyethylene; and the atom models themselves, while possibly of a rigid material, may also be of the same resilient organic plastic material as the connectors.

Numerous special features are provided in connection with this atomic model set to accommodate special situations and special conditions which are met with in chemical compounds. Among these are special type connectors representing double and triple bonds respectively and which are preferably provided with vanes or splines extending longitudinally of the connector in question and arranged to be received in spline-receiving slots formed in the entrance portion of recesses with which these connectors are to be used. This prevents relative rotation between atom models so connected. The arrangement is further such that a recess arranged to receive a connector representing a triple bond, for example as in acetylene, is also capable, without change, of receiving a connector representing a double bond, or alternatively, a connector representing a single bond. In the same way, a recess in an atom model intended to receive a connector representing a double bond may also receive a connector representing a single bond, but will not be capable of receiving a connector representing a triple bond. These double bond-type connectors may be used, for example, in connection with models of the type used to represent the carbon atoms in the ring nuclei of aromatic compounds.

Another special feature embodied in the models according to the present invention and which is alternatively usable or which may, if desired, be omitted, is that of providing means to represent "hydrogen bonding," i.e. a type of bonding of a lower order of bonding force than that afforded by the more conventional atom-to-atom chemical bonds. In this instance, this relatively lower order of force is represented by the magnetic attraction between permanent magnet elements which may be embedded in certain of the atom models and magnetizable material, such as soft iron (not necessarily permanently magnetized), which may be embedded in other atom models, which are potentially to be "hydrogen bonded" to those models containing the permanent magnets.

Other and more detailed features and advantages of the present invention will become apparent from a detailed description thereof which follows and will be illustrated in the accompanying drawings, in which:

Fig. 1 is a view of a plurality of atom models bonded together to represent the molecule iodobenzene ($C_6H_5I$);

Fig. 2 is a side elevation of the molecular model shown in Fig. 1;

Fig. 3 is a view of a model representing a hydrogen atom, this model having an integral connector and further being provided with an embedded piece of magnetic material;

Fig. 4 is a view of the model of Fig. 3 as seen from the bottom of that figure;

Figs. 5 and 6 are end and side views respectively of a model representing trigonal carbon, i.e. a carbon atom as it exists in an aromatic ring compound such as benzene;

Fig. 7 is an enlarged sectional view taken on the line 7—7 of Fig. 6;

Fig. 8 is an end elevation of a model representing acetylenic carbon, i.e. a carbon atom arranged to be connected by one triple bond with another atom;

Fig. 9 is a side elevation of the model of Fig. 8 looking toward that side provided with the recess arranged for the receipt of a triple bond-type connector;

Fig. 10 is a view representing a nitrile nitrogen atom having integrally formed therewith a triple bond-type connector which could, for example, be connected to the carbon atom model shown in Figs. 8 and 9;

Fig. 11 is a view of the model of Fig. 10 as seen from the bottom in that figure;

Figs. 12 and 13 are views from one side and one face respectively of a model representing an amino-nitrogen atom having recesses for connections to three models representing single bonded atoms;

Figs. 14 and 15 are views which may be considered as in elevation and in bottom plan respectively, showing a model representing a carbonyl-type oxygen atom, i.e. an oxygen atom arranged to be connected by a double bond to another atom, the connector shown in this case being integral therewith;

Fig. 16 is a view in perspective and on a greatly enlarged scale illustrating a model representing a single bond-type connector;

Fig. 17 is a view similar to Fig. 16 illustrating a model representing a double bond-type connector;

Fig. 18 is a view similar to Figs. 16 and 17 illustrating a model representing a triple bond-type connector;

Figs. 19 and 20 are views in elevation and center section respectively of a molecular model made up of a plurality of atomic models and suitable connectors illustrating the carbon-to-carbon nucleus and a carbonyl-type oxygen atom arranged as in the compound, cyclopropanone

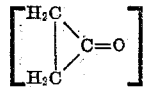

Fig. 21 is a view of a model representing an oxygen atom arranged for individual connection to two different models representing monovalent atoms and further provided with an embedded piece of permanently magnetic material for illustrating hydrogen bonding with respect to such oxygen atom; and Fig. 22 is a section of the model of Fig. 21 as seen on the line 22—22 thereof.

As generally set out hereinabove, the present invention provides a set of atomic models which embody features not found in any such set heretofore available in that the model set according to the present invention may be relatively easily and cheaply made of moldable organic plastic material and the models themselves, and also their connectors, may be formed of such a material which is flexible and resilient, so as to permit the interconnection of the models and their connectors to provide great flexibility in assembling models into molecular models, which are essentially realistic with respect to known chemical principles. While it is generally desirable that a model set of this kind can be assembled into molecular models only in accordance with accepted chemical principles; this desired result is not wholly attainable. The present set approximates this result to a practical extent, however.

In view of the flexible character of the connectors, it is possible in accordance with the present invention to make realistic models of such complicated and essentially different chemical molecules as cyclopropanone, cyclobutane, phthalic anhydride, indene, indane, porphyrins, phthalocyanines, and other molecules which cannot be made with other model sets available to the prior art without employing special variations of the atoms involved or bonding units of excessive and unrealistic length. At the same time, the present atomic models are so constructed and arranged that it is impossible to prepare some molecular models, which it is known from chemical principles, cannot exist.

The principles embodied in the present invention are illustrated, for example, by a consideration of a typical organic chemical compound such as iodobenzene ($C_6H_5I$), an atomic model of which is illustrated in Figs. 1 and 2. As shown in these figures, the carbon ring nucleus of the molecule is made up of six carbon atoms represented by models 25, each of which is, in effect, a trigonal carbon atom, these atom models being shown in detail in Figs. 5, 6 and 7. The six carbon atoms are connected to one another, as is conventional with carbon atoms in a benzene ring, this interconnection involving alternate single and double bonds. Thus, in the molecular model shown in Fig. 1, there is a representation of a conventional aromatic ring compound, which is often considered as involving alternate single and double bonds. In this figure, there are provided alternate single bonds represented by single bond-type connectors 26 and double bonds represented by double bond-type connectors 27. The single bond connectors are shown in detail in Fig. 16 and the double bond connectors in Fig. 17. These connectors will be described more in detail presently.

In addition, the molecular models of Figs. 1 and 2 embodies atom models 28 representing hydrogen, which may be identical with the detailed showings in Figs. 3 and 4. In addition, there is an atom model 29 representing iodine.

Each of these models is preferably formed with dimensions corresponding proportionately to the known Van der Waals' and covalent radii. As shown, the monovalent atoms, hydrogen and iodine, are generally shown as portions of spheres with one side portion cut off to indicate the dimension from the nucleus (the center of the sphere) to a surface corresponding generally to the dimension of the atom in its compounds or the covalent radius thereof. Inasmuch as such dimensions and the relative proportion of the atom models are well-known from chemical principles and further have been embodied in atom models in the past, no further detailed description of this phase of the model set will be given herein.

The models 25 representing trigonal carbon atoms are generally cylindrical in form, but with rounded ends as shown in detail in Figs. 2, 5 and 6.

As a general plan in making up the atomic model set, the models representing the several atoms are provided with one or more connector-receiving recesses, depending upon the valence of the atom represented. These recesses are respectively arranged to receive connectors by which a given atom may be connected with another. Thus, where an atom is capable of being connected to several other atoms by single or multiple bonds, there will be a corresponding number of recesses in the atom model for the receipt of single or multiple bond-type connectors as hereinafter particularly described. The recesses are best shown in Fig. 7 and each comprises an enlarged cavity 30 into which an enlarged end portion of a connector may be inserted through a relatively restricted entrance portion 31 of the recess.

If it be assumed than that the entrance portion is round, as in the normal case for a recess for receiving a connector representing a single valence bond, then the connector in question may be formed, for example, as shown in Fig. 16 with enlarged portions 32 at each end and a relatively narrow neck portion 33 therebetween. The enlarged portions 32 are slightly larger in diameter than the diameter of the entrance portion 31 of the recess, although the outer diameter of the enlarged portions 32 is somewhat smaller than the inner enlarged portion or cavity 30 of each recess.

The material of which the connectors at least are formed is preferably a flexible and resilient plastic material, such as polyethylene. The sizes of the enlarged portions 32 and the entrance portions 31 of the recesses are so cordinated with one another that a connector may be inserted in any recess by the application of a reasonable amount of force; and yet will be held therein against inadvertent disassembly by a resilient force, sufficient in character and amount to prevent the inadvertent separation of any connector from any recess in which it may be placed.

While the inside of each recess portion 30 is shown as substantially cylindrical, this shape is not essential as it is necessary merely that there be sufficient space to receive an enlarged portion 32 of a connector 26. Again, while the enlarged portions 32 are shown as substantially spherical, this also is not essential, it being necessary only that the enlarged portion shall be somewhat larger in one or more directions perpendicular to the longitudinal axis of the connector (i.e. of the neck portion 33 thereof) than the corresponding dimension or dimensions of the entrance portion 31 of each recess. The shapes shown constitute merely preferred shapes which lend themselves to relatively easy manufacture and to rapid assembly and intentional disassembly as desired, without the likelihood of inadvertent disassembly. As such, the atomic models are adapted to be connected together by connecting means in effect similar to those used in the so-called "poppit beads" which have recently become popular in the field of costume jewelry.

The models 28 representing hydrogen atoms as shown in Figs. 3 and 4 may each be provided, for example, with an integral connector portion 34, which similarly includes an enlarged outer end portion 32 corresponding to the portions 32 at each end of the connector 26 in Fig. 16. This type of integral connector may be used with certain monovalent atoms, for example, with the reservation, however, that in the event that the set is to be used to teach basic or elementary chemistry, it is preferred that the models representing the monovalent atoms, which are to be provided with integral connectors as at 34 (Fig. 3) shall be all of a certain normal polarity of valence, such as positive valence atoms, for example, hydrogen. In this way, models representing monovalent atoms having normally negative valences, such as chlorine, could be provided with recesses substantially as hereinabove described and substantially as shown in Fig. 7. This would enable simple compounds, such as hydrogen chloride, to be illustrated by combining two such monovalent atom models.

Where one atom is to be bonded to another by a double bond, a different type connector model is used as shown, for example, in Fig. 17. In accordance with the showing in this figure, the two enlarged portions provided as aforesaid may correspond substantially in size and location to the enlarged portions 32 of the single valence bond-type connector 26 of Fig. 16 and thus are given the same reference numbers. There is provided, however, in lieu of the simple, relatively small diameter neck portion 33, a pair of oppositely directed spline portions 35 or, in other words, the intermediate connection between the enlarged portions 32 of the connector 27 may be in effect a flattened or ribbon-like portion, rather than a substantially cylindrical portion.

The thickness of this intermediate portion of the connector 27 is preferably no greater and may possibly be slightly less than the diameter of the neck portion 33 of the connector 26 of Fig. 16.

The entrance portions of the recesses which are arranged to receive connectors 27 may then be provided with oppositely directed spline-receiving slots 36 as shown in Figs. 6 and 7. Thus, when one of the connectors 27 is inserted in a recess provided with oppositely directed slots 36, relative rotation between connector 27 and the atomic model with which it is connected is prevented by the cooperating splines 35 and slots 36.

It is preferred in forming the models 25 representing trigonal carbon, that all three of the recesses, which are provided at 120° to one another, shall be of a type to receive double bond-type connectors 27. This is a matter of convenience only, as it is necessary merely that there be one such recess in order that the carbon-representing model shall have a total potential valence of 4, as is customary in organic compounds. However, in accordance with the present invention, any recess provided with oppositely directed slots 36 may also and without change receive one of the connectors 26 as shown in Fig. 16 representing a single bond or be connected, for example, to a hydrogen atom represented by the model 28 of Figs. 3 and 4 wherein the connector 34 has no splines thereon. It is preferred, however, in providing models representing trigonal carbon that there be three double bond-type receiving recesses, so that such models may be used in making up molecular models of aromatic compounds without requiring care to be taken to position a certain one only such double bond-receiving recess in a particular direction.

Carbon atoms such as are embodied in aliphatic compounds or in an aliphatic side chain attachable to an aromatic compound, which are sometimes referred to as tetrahedral carbon atoms, are preferably represented by substantially spherical models in accordance with this invention and are provided with four recesses, with the solid angle between the axis of the four recesses which will be formed therein about 109°28'. Such tetrahedral carbon atoms may be formed as shown in Figs. 19 and 20 and hereinafter described. The recesses to be used in such tetrahedral carbon atom models will be of a type for the receipt of single bond-type connectors only, as shown in Fig. 16.

There are some compounds, for example, acetylene, in which carbon is bonded to another atom (another carbon atom in the case of acetylene) by a triple bond. The present model set is arranged to simulate such triple bond by connectors as shown, for example, at 37 in Fig. 18, these connectors similarly having enlarged portions 32 adjacent to each end thereof and further having four splines 38 disposed at 90° to one another about the central axis of the connector (which is assumed to be that axis connecting the centers of the spherical enlargements 32). The recesses for receiving the connectors 37 are illustrated in Figs. 8 and 9 at 39 and are provided with four spline-receiving openings 40 arranged at 90° to each other about the axis of the respective recess. The recesses 39 are adapted not only to receive the connectors 37 representing triple bonds, but also are adapted to receive connectors as shown at 27 in Fig. 17 representing double bonds and further, are adapted to receive connectors as shown at 26 in Fig. 16 representing single bonds. It will be understood that the provision of a combination of spline arrangements serving as to multiple bonds to prevent relative rotation between a connector and a recess in which it is receivable and differentiating between single, double and triple bonds is a broad purpose of the invention, the arrangement shown being a preferred embodiment of this principle. Other spline arrangements are considered to be within the purview of the invention.

In Figs. 8 and 9 is shown a model 41 representing acetylenic carbon, i.e. a carbon atom shown as a flattened disc with rounded edge portions arranged to have a triple bond-receiving recess 39 on each side. In this way the models 41 may be used to represent carbon in a compound such as acetylene and also to represent a carbon atom in a cyanide radical as —CN. As stated above, the recesses 39 may serve alternatively to receive double bond type connectors 27 or single bond type connectors 26.

There is illustrated in Figs. 10 and 11 a model 42 representing a nitrile nitrogen atom having an integral connector portion 43 corresponding to about one-half of the connector 37 of Fig. 18 and embodying an enlarged portion and four splines arranged at 90° with one another. Such a connector portion is adapted to be received, for example, in a recess as shown at 39 in Fig. 9.

Trivalent amino-nitrogen may be represented by models as shown at 44 in Figs. 12 and 13, these models having a spherical portion 45 and three flattened surfaces 46 and each of the surfaces 46 being provided with a single bond-type recess 47. Each of the recesses 47 is arranged to receive a single bond-type connector 26 as shown in Fig. 16 for attachment to some monovalent atom model. It is contemplated, for example, that models representing hydrogen atoms as shown at Figs. 3 and 4 may alternatively (a) be provided with integral portions as shown at 34 so that they may be removably attached to the atom models 44 representing amino-type nitrogen; or (b) be provided with a recess receptive of a single bond-type connector 26 for suitable attachment, for example, to the recesses 47 of the models 44, Figs. 12 and 13.

There is also shown in Figs. 14 and 15 a model 48 representing a carbonyl-type oxygen atom, i.e. an oxygen atom arranged to be connected by a double bond connector to some other atom having a recess therein as shown, for example, at 36 in Fig. 7. In this instance, however, a connector portion 49 of the model 48 may be integral with the principal portion of the model and may correspond to one-half of the connector 27 of Fig. 17. As such, it has oppositely directed splines, arranged at 180° to each other about the central axis of the connector, these splines being adapted to be received in spline-receiving slots as shown at 36 in Fig. 7 or alternatively in two of the four opposite spline-receiving slots as shown for the recess 39 in Fig. 9.

In Figs. 19 and 20 there is illustrated the carbon-to-carbon nucleus and the attached oxygen atom of the compound cyclopropanone, the hydrogen atoms which are attached to two of the carbon atoms in this compound being indicated only in Fig. 19 and only in dotted lines, as otherwise these hydrogen atoms would obscure the showing of the models representing the carbon atoms.

In these views, there is shown a model 25 representing a carbon atom of the trigonal type as illustrated in Figs. 5–7. There is also shown a model 50 representing a carbonyl-type oxygen atom which is similar to the models 48 with the exception that it is not provided with an integral connector 49 as shown in Figs. 14 and 15, but rather is provided with a suitable recess so that a double bond-type connector 27 may be used therewith. This connector may be suitably connected into one of the double bond-type recesses 31 as shown in detail in Fig. 7; while the other recesses in this same trigonal-type atom model 25, as shown in Fig. 20, while capable of receiving a double bond-type connector, are in fact used to receive single bond-type connectors 26.

As particularly shown in Figs. 19 and 20, these connectors 26 are of sufficient length and have sufficient flexibility to enable a three-membered ring to be formed using one carbon atom of the trigonal type 25 and two tetrahedral carbon atoms 51, each of which is provided with four recesses and each capable of being connected by a single bond-type connector 26 to another atom.

It will be understood that the models representing hydrogen atoms which are shown in dotted lines at 52 in Fig. 19, may, for example, be the same as those shown in Figs. 3 and 4 and may be provided either with integral connectors as shown with those figures or with recesses for the receipt of separate single bond-type connectors 26. This molecular model is merely an example of the use of the atom model set of the present invention in making up molecular models such as cannot practically be made with some prior art-type model sets because of the angular relationships involved or because the prior art sets, when provided with flexible connectors, were not so arranged as to hold the connectors and the several atom models together against the type of mechanical force which would normally be effective in a molecular model as shown in Figs 19 and 20.

In Figs. 21 and 22 is shown a model 53 representing an oxygen atom having a pair of recesses 54 for connection to other atoms in a manner taught herein. This model further is provided with magnetic means intended to simulate hydrogen bonding by the use of a force of lower magnitude than that which holds the connectors and atom models together in accordance with the present invention. This lower magnitude force is preferably provided by embedding permanent magnets of suitable materials such as "Alnico" in some of the atom models, while embedding magnetizable material, such as iron, in other of the models. As shown in the accompanying drawings, a piece of permanent magnetized material is indicated at 55, this piece being of any suitable material capable of being permanently magnetized such, for example, as "Alnico." Other models representing hydrogen shown in Figs. 3 and 4 may have embedded therein pieces of magnetizable material, such as iron, as shown, for example, at 56. Thus, when one or more molecules containing one or more atom models having permanent magnets embedded therein are brought into spacial proximity with models such as those shown in Figs. 3 and 4 having magnetizable material embedded therein, there will be a sufficient magnetic attraction to simulate the attraction which is known in chemistry as "hydrogen bonding." It is contemplated that if desired, all atoms intended to simulate hydrogen bonding may be equipped with permanent magnets; but if this is done, care must be taken so that atom models which are to be attracted to one another have opposite poles of such magnets directed so as to attract one another. This difficulty, however, may be overcome in practice by providing permanent magnets in only one of this group of atom models capable of so-called "hydrogen bonding," while embedding magnetizable material which are not permanent magnets in the other as particularly described hereinabove.

It will be understood that the preferred material of which the models and their connectors are made in accordance with the present invention is a non-metallic, non-magnetic moldable, organic plastic material, such as polyethylene, and one which has sufficient flexibility and resilience so that connectors formed therefrom may have a snap action fit into a recess in which they may be engaged. It is further contemplated that other materials besides polyethylene could be used if desired; and, for example, that the connectors may be made of one material and the atomic models, including their several recesses, of another material. It is further contemplated, for example, that models representing different atoms may be of different colors or different combinations of colors, so as to afford a quick visual indication of the respective atoms represented, once a person is familiar with the color code employed. It is also contemplated that the name or chemical symbol of different atoms may be impressed into or printed on the respective models so as to aid in the teaching function in the use of the set as a whole.

While there are herein shown and described but a few of the principles and certain embodiments thereof upon which the design of the atomic models according to the present invention is based, it is contemplated that other variants and detailed features will occur to those skilled in the art from the foregoing description. I do not wish to be limited, therefore, except by the scope of the appended claims, which are to be construed validly as broadly as the state of the prior art permits.

What is claimed is:

1. A set of atomic models arranged to be removably attached together to simulate the arrangements of atoms in various different molecules, said models representing different atoms respectively, including carbon, hydrogen, oxygen and nitrogen; each of said atom models being of a predetermined size and in proportion to the known Van der Waals' and covalent radii for the respective atoms; connecting means for said models including recesses therein in accordance with the number of valences of the respective atoms represented, each of said recesses being arranged for the receipt of a connector by providing as to each recess, an entrance portion which is constricted with respect to the size of the recess inside such entrance portion; said connecting means further comprising a plurality of flexible connectors formed of resilient material, each of said connectors serving to represent at least one valence bond between two atoms and each having an enlarged portion on each end thereof and a relatively smaller constricted portion connecting the enlarged portions, and in which said enlarged portions are smaller in their transverse dimensions than the inner portions of said recess, but slightly larger than the entrance portion thereof; said atomic models being constructed and arranged to be combined together by the use of said flexible connectors so as to represent different molecules, in some of which the connectors are required to be flexed, but in which the resilient connection between said connectors and individual atom models substantially prevents inadvertent disassembly of the built-up molecular models notwithstanding the flexure of some of said connectors; said set of atomic models further comprising some atom models corresponding to atoms which are adapted to be connected to other atoms by multiple valence bonds, in which the models corresponding to the multiple valence bond type atoms are proivded with recesses formed in part as aforesaid and further having at least one spline-receiving slot extending from the constricted entrance portion of said recess, and in which the flexible connectors are provided, in addition to the parts above described, with at least one longitudinally extending spline, so that when one of these spline-provided connectors is inserted in a recess having a spline-receiving slot therein, relative rotation between the connector and the model so connected is prevented, while the recess provided with at least one spline-receiving slot is also adapted to receive connectors as aforesaid formed without splines and representing single valence bonds.

2. A set of atomic models in accordance with claim 1, in which double bonds connecting atoms are represented by certain of said flexible connectors which are provided with two splines extending laterally in opposite directions from the longitudinal axes of said connectors, and in which the recesses arranged to receive such connectors are provided with spline-receiving slots arranged at about 180° from each other.

3. A set of atomic models in accordance with claim 1, in which triple bonds connecting atoms are represented by certain of said flexible connectors which are provided with four splines extending laterally and at about 90° with one another around the longitudinal axes of such connectors, and in which the recesses arranged to receive such connectors are provided with four spline-receiving slots arranged at about 90° from each other, whereby such recesses may also receive connectors representing double bonds and provided with two oppositely directed splines and may also receive connectors having no splines and representing single bonds.

4. A set of atomic models in accordance with claim 1, in which certain of said models represent trigonal carbon atoms, such as are contained in the nuclei of aromatic compounds, and are provided with three equiangularly spaced recesses, each constructed and arranged to receive a connector which is provided with a pair of oppositely directed splines and which represents a double bond, at least one of said recesses being further adapted to receive a connector means representing a single bond.

5. A set of atomic models in accordance with claim 1, in which certain of said models represent oxygen atoms, such as the ketone oxygen of an organic compound, and for this purpose are each provided with an integral connector portion having oppositely disposed splines, which connector portion is arranged to be received in a recess, the entrance portion of which has oppositely disposed spline-receiving slots.

6. A set of atomic models in accordance with claim 1, in which certain of said models represent a carbon atom which may be connected by a triple bond to another atom, such as a carbon atom in the acetylene molecule, such model representing an acetylene-type carbon having recesses therein formed with spline-receiving slots at substantially 90° to one another, each for receiving a connector having four laterally extending splines thereon arranged at about 90° and representing a triple valence bond, each of the recesses having slots as aforesaid being adapted also to receive a connector representing a double bond, or alternatively, a connector representing a single bond.

7. A set of atomic models in accordance with claim 1, in which certain of said models represent trivalent, nitrile-type nitrogen, and are provided with integral connector portions, which have four splines extending at about 90° to one another.

8. A set of atomic models arranged to be removably attached together to simulate the arrangements of atoms in various different molecules, said models representing different atoms respectively, including carbon, hydrogen, oxygen and nitrogen; each of said atom models being of a predetermined size and proportion to the known Van der Waals' and covalent radii for the respective atoms; connecting means for said models including recesses therein in accordance with the valences of the respective atoms represented, each of said recesses being arranged for the receipt of a connector by providing as to each recess, an entrance portion which is constricted with respect to the size of the recess inside such entrance portion; said connecting means further comprising a plurality of flexible connectors formed of resilient material, each of said connectors serving to represent at least one valence bond between two atoms and each having an enlarged portion on each end thereof and a relatively smaller constricted portion connecting the enlarged portions, and in which said enlarged portions are smaller in their transverse dimensions than the inner portions of said recesses, but slightly larger than the entrance portion thereof; said atomic models being constructed and arranged to be combined together by the use of said flexible connectors so as to represent different molecules, in some of which the connectors are required to be flexed, but in which the resilient connection between said connectors and individual atom models substantially prevents inadvertent disassembly of the built-up molecular models notwithstanding the flexure of some of said connectors; in which certain of said models representing hydrogen atoms and certain other of said models representing other atoms capable of "hydrogen-bonding" with hydrogen atoms, are equipped respectively with magnetic means representing a force lower in character than the force required to break the bond between two atoms bonded to one another in a molecule by chemical bonds; said magnetic means comprising permanent magnets respectively embedded in the material forming certain of said models representing atoms of a first group, and magnetizable material respectively embedded in the material forming models representing atoms of a second group, which are capable of being bonded by "hydrogen bonding" with the atoms of said first group, one of said groups consisting of hydrogen atoms.

References Cited in the file of this patent

UNITED STATES PATENTS

| | | |
|---|---|---|
| 2,308,402 | Taylor | Jan. 12, 1943 |
| 2,714,269 | Charles | Aug. 2, 1955 |

FOREIGN PATENTS

| | | |
|---|---|---|
| 479,746 | Canada | Dec. 25, 1951 |
| 1,101,229 | France | Apr. 20, 1955 |

OTHER REFERENCES

The Review of Scientific Instruments, vol. 24, No. 8, August 1953, pages 621–625, article of Pauling et al. on Molecular Models.